United States Patent [19]

Mack et al.

[11] 4,074,208
[45] Feb. 14, 1978

[54] STABILIZED REPETITIVELY PULSED FLASHLAMPS

[75] Inventors: Michael E. Mack, Manchester; Donna B. C. Northam, Malden, both of Mass.

[73] Assignee: Jersey Nuclear-Avco Isotopes, Inc., Bellevue, Wash.

[21] Appl. No.: 614,223

[22] Filed: Sept. 17, 1975

[51] Int. Cl.² .......................................... H01S 3/092
[52] U.S. Cl. ........................ 331/94.5 P; 331/94.5 L; 330/4.3
[58] Field of Search .................. 330/4.3; 331/94.5 P, 331/94.5 D; 313/231.4, 231.5, 231.7; 315/241 P, 173, 174, 176

[56] References Cited

U.S. PATENT DOCUMENTS

| | | | |
|---|---|---|---|
| 3,504,154 | 3/1970 | Marcolini | 315/176 |
| 3,551,738 | 12/1920 | Young | 315/173 |
| 3,646,395 | 2/1972 | Pratti | 331/94.5 P |
| 3,911,375 | 10/1975 | DeMaria et al. | 330/4.3 |
| 3,914,648 | 10/1975 | Friedman et al. | 315/241 P |
| 3,968,400 | 7/1976 | Weinreich | 315/176 |

OTHER PUBLICATIONS

Rubueldth et al., "Comparison Between Different Excitation Methods for TEACO Lasers", 1972, pp. 211–216, Atomkernergie 19 (3).

Mack, "Vortex Stabilized Flashlamps for Dye Laser Pumping", Jan. 1974, pp. 46–55, Applied Optics, vol. 13, No. 1.

Mack, ".2-W Repetitively Pulsed Flashlamp – Pumped Dye Laser", Aug. 15, 1971, pp. 108–110, A.P.L., vol. 19, No. 4.

Anderson et al., "Performance Study of a Vortex Stabilized...", Nov. 1965, Applied Optics, vol. 4, No. 11.

Cann. "Light Source in the .15–20µ Spectral Range", Aug. 1969, pp. 1645–1661, Applied Optics, vol. 8, No. 8.

Primary Examiner—Nelson Moskowitz
Attorney, Agent, or Firm—Weingarten, Maxham & Schurgin

[57] ABSTRACT

A flashlamp for exciting a laser medium having a vortex stabilized continuous low level DC discharge. The stabilized continuous discharge is periodically pulsed with a high energy discharge to provide pulses of excitation radiation that are focused into the laser medium to promote lasing thereof.

13 Claims, 9 Drawing Figures

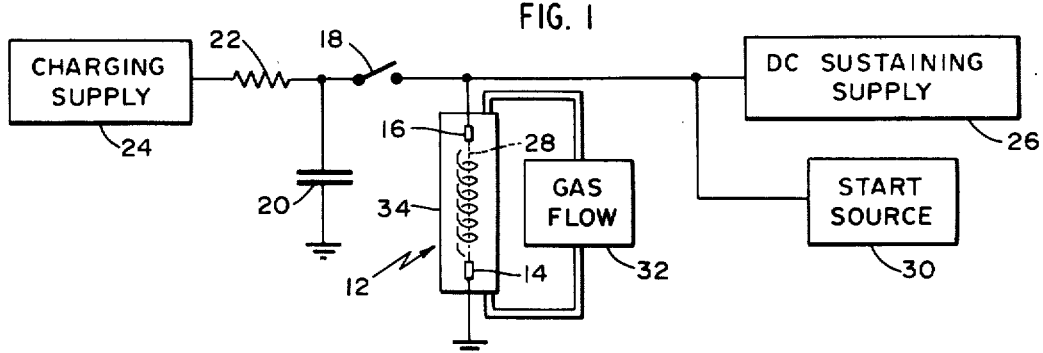
FIG. 1
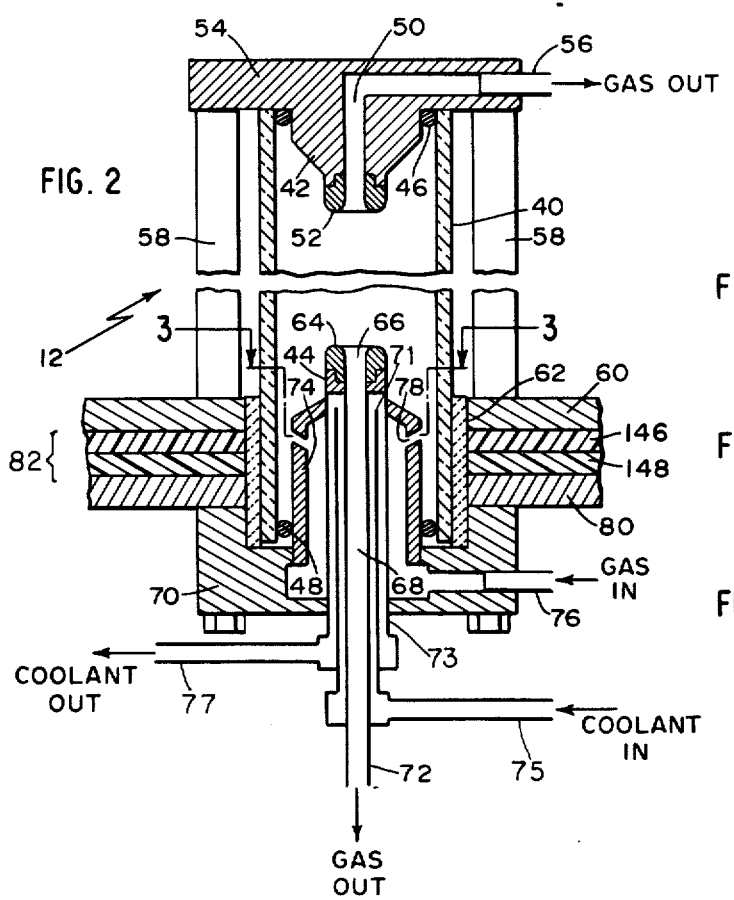
FIG. 2
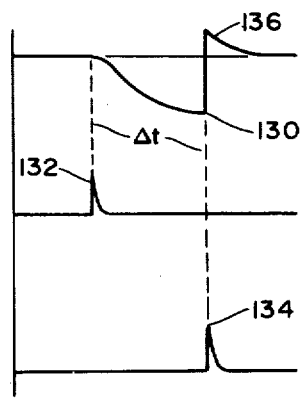
FIG. 6A
FIG. 6B
FIG. 6C
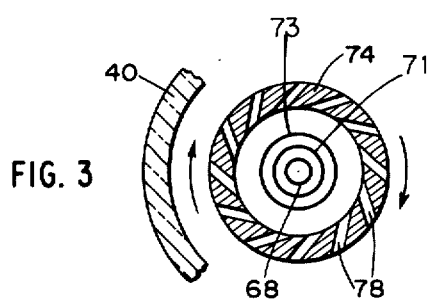
FIG. 3
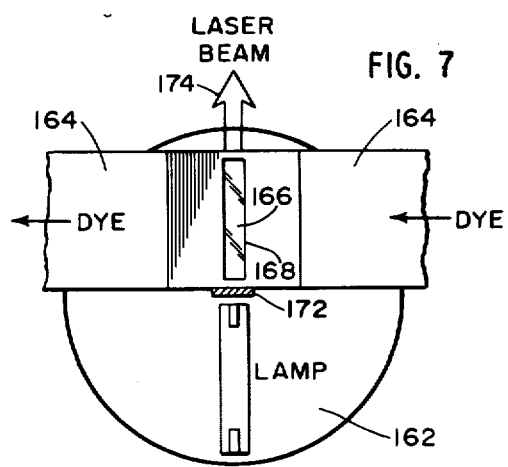
FIG. 7

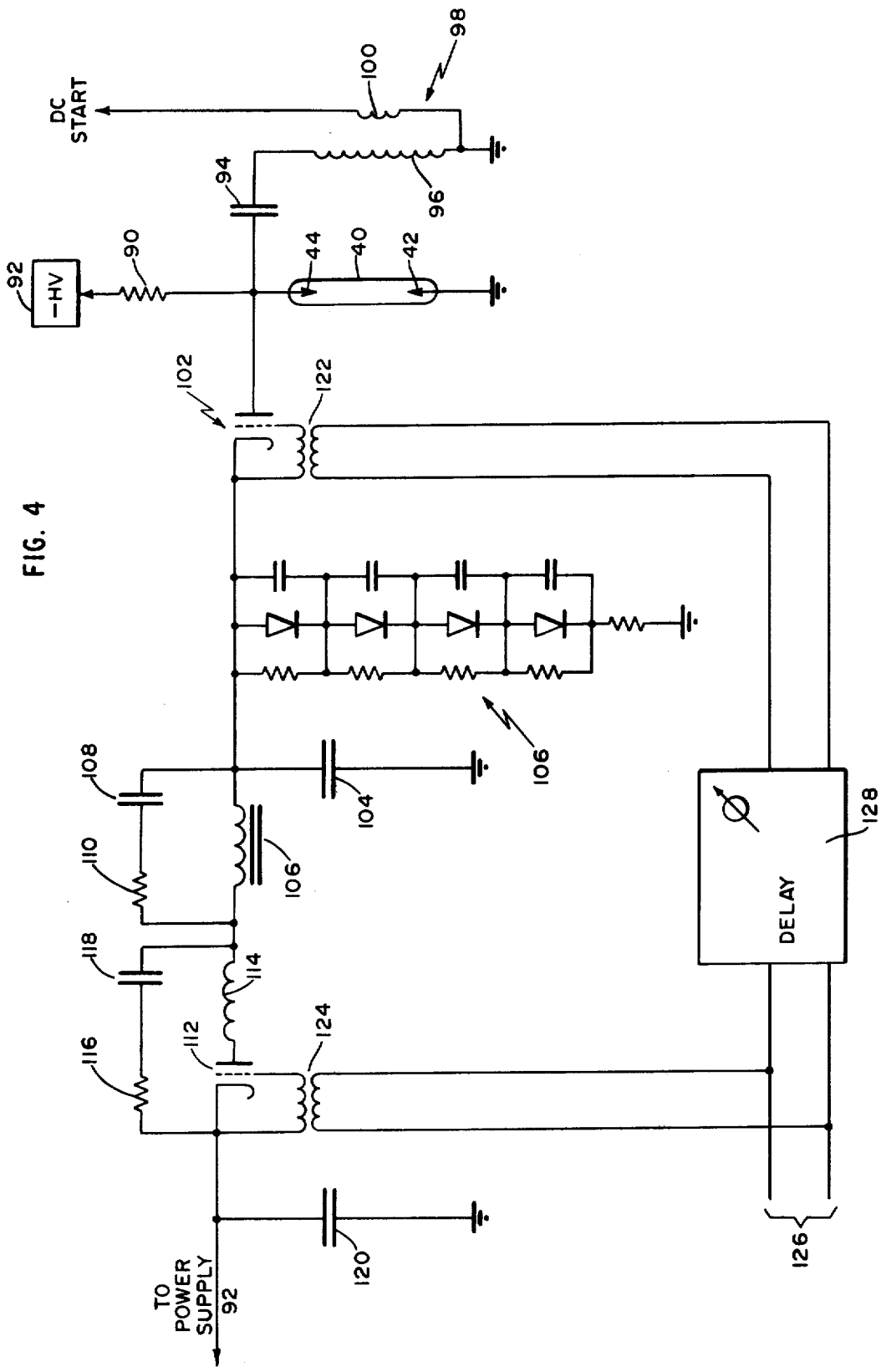

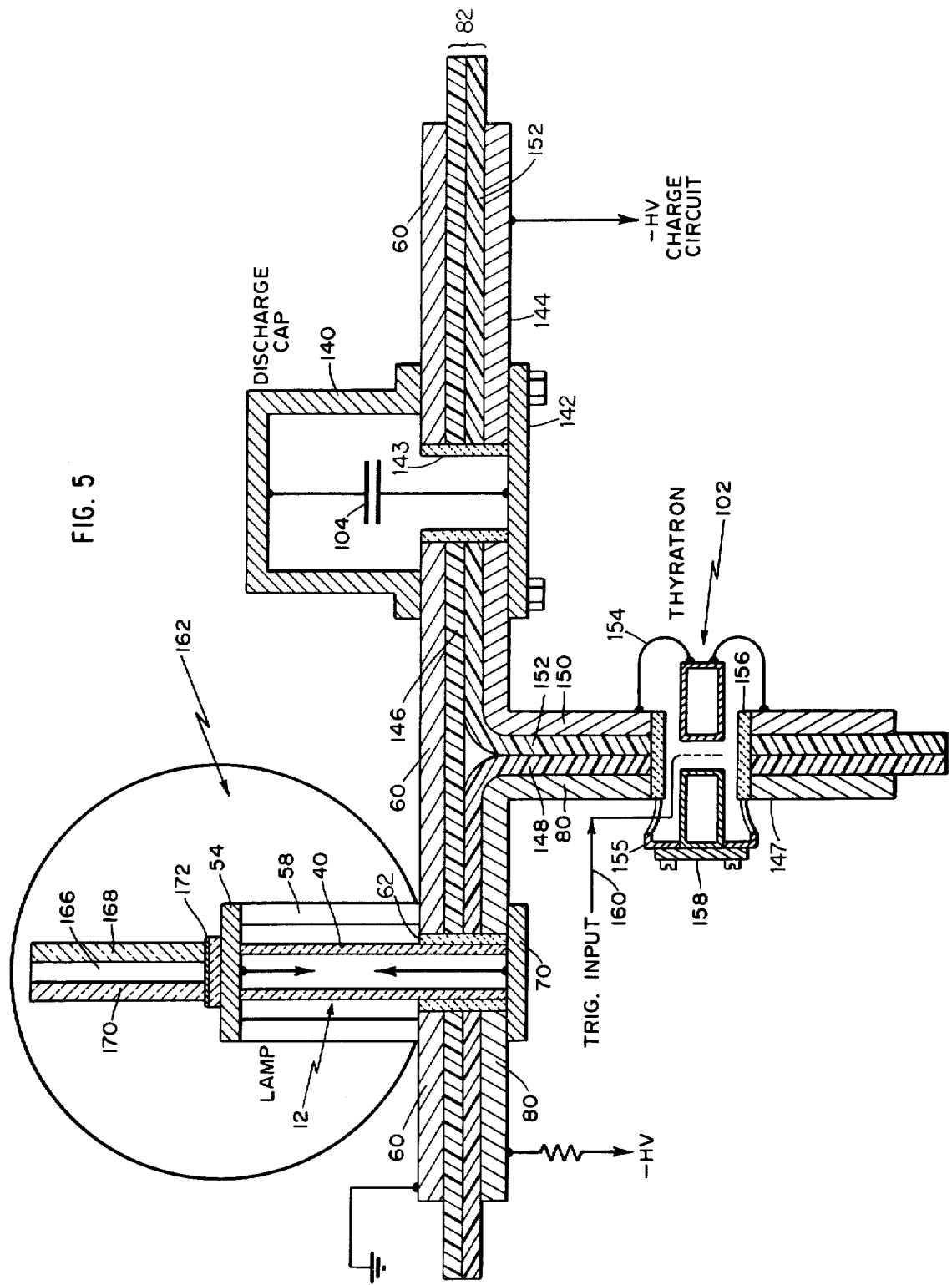

STABILIZED REPETITIVELY PULSED FLASHLAMPS

FIELD OF THE INVENTION

The present invention relates to flashlamps and in particular to a stabilized flashlamp for pulsed excitation of a laser medium.

BACKGROUND OF THE INVENTION

Flashlamps are extensively used as a source of excitation radiation for energizing a laser medium to a lasing condition. For this purpose, the radiation in the flashlamp discharge arc or high energy plasma is typically focused by lenses or mirrors into the laser medium. It is thus necessary that the path of the arc discharge in the flashlamp between the energized electrodes be consistent or stable so that the point of focus of the discharge radiation will remain constant at the point of desired energization of the lasing medium.

Where it is desired to energize the laser medium for a series of high energy pulses a laser output, the flashlamp used to energize the medium will typically be a pulsed discharge as well. The path of the arc discharge between the electrodes of the flashlamp for each pulse of energization will, however, not normally be a constant where there is a large unbounded volume of gas within the flashlamp. Accordingly, such a lamp is unsatisfactory for use in exciting a laser medium for most applications.

The solution conventionally applied to this problem is to confine the discharge gas between the electrodes to a long narrow tube of quartz or glass such that the plasma created by the discharge is itself physically contained laterally between the electrodes giving rise to a more consistent arc discharge path. Such narrow tubes, however, introduce other difficulties for high pulse rate, short flash duration applications which shorten the lamp lifetime or reduces its efficiency. With such tubes, collection of deposits on the tube wall from erosion and sputtering of the electrodes and ultimately devitrification of the glass is more rapid. These in turn lead to greater heat absorption by the tube from discharge radiation and increase the already great thermal stress. The probability of tube explosion from shock wave effects in high rise time discharge is also aggravated.

A technique for stabilizing the discharge of a flashlamp and avoiding these other problems is to establish a vorticular flow of gas within a wider tube for the flashlamp by the introduction of a cool gas with a circumferential flow component. This effect works well for short arcs in the range of a few centimeters or for continuous arc discharges where the arc can be mechanically drawn from a short distance up to a longer distance of, for example, 20 centimeters.

Such a technique, however, is ineffective to stabilize long arcs of short duration pulsed discharges as is typically employed for pulsed laser energization. In such case, the long arc is desired in order to increase the impedance of the discharge and augment the energy radiated from it, while pulsed application is typically desired for lasers using a flowing medium such as a dye solution, the laser beam from which is useful in isotope separation. Such long, pulsed arcs will typically be unstable even with vortex stabilization in wider flashlamp tubes. This is due to the lack of a preexisting preferential path for each discharge pulse between the electrode such as caused by a temperature or pressure gradient resulting in a hot central region which would tend to confine the arc to the central line between the electrodes. Such a condition cannot be maintained between each pulse in high power discharges unless there is created a preexisting hot, plasma between the electrodes along the desired path for the discharge as suggested in an article by K. H. Hocker, entitled "Transient Discharges Across Vortex Stabilized Arcs" in a paper by the Institute fur Hochtemperaturforschung of the Technische Hochschule Stuggart, Germany. There, preionization for a discharge path is described in an experimental investigation of the heating of dense plasmas generated by the discharge of a capacitor bank across the preionized channel.

BRIEF SUMMARY OF THE INVENTION

The present invention, in a preferred embodiment, provides a system for stabilizing long pulsed arc discharges of a flashlamp used to provide pulse excitation of a laser medium. The flashlamp of the present invention combines a vorticular gas flow with a continuous low level discharge between the electrodes that defines a consistent, straight discharge path between the electrodes for the repeated high energy pulse discharges used to energize the laser medium.

The apparatus of the preferred embodiment comprises a flashlamp tube whose walls are substantially removed from the heated plasma of the arc discharge in order to permit vortex stabilization and to reduce the rate of tube wall deterioration or chance of explosion. Electrodes are sealed into either end of the flashlamp tube and a vorticular flow of an inert gas such as argon is established between the electrodes by pumping gas into the flashlamp near the tube walls at slightly above ambient pressure and with a circumferential velocity component and by extracting it from the flash tube through central passages in each electrode at ambient pressure. The vortex and pressure differential establishes a radial pressure gradient directed away from the region of discharge that creates conditions for a stable arc. A low level continuous DC discharge is then struck between the two electrodes and is stabilized to the low impedance path along the electrode axis defined by the lower relative pressure there. A stable, high energy discharge may then be periodically initiated between the electrodes which will be confined to the low impedance discharge path. A temperature gradient resulting from the discharge, further assists in confining the path.

The flashlamp and power supply circuit are formed onto a low inductance low capacitance mounting plate to minimize high frequency effects to permit high rise time, short durations to the high energy pulses. The flashlamp is installed into a spherical reflector for excitation through the window of a dye channel containing a flowing dye solution.

The entire assembly provides a high energy pulsed laser using an efficient, long-lived flashlamp energy source for the laser medium that permits uninterrupted pulsed laser operation over extended periods as is desired for use in isotope separation by isotopically selective laser photoexcitation and ionization.

BRIEF DESCRIPTION OF THE DRAWING

The features of the invention described above are more fully set forth below in the detailed description of the preferred embodiment, presented for purposes of illustration and not by way of limitation, and in the accompanying drawing of which:

FIG. 1 is a system diagram of the high energy pulsed flashlamp and power supply system of the present invention;

FIG. 2 is a detailed mechanical view of the flashlamp structure according to the preferred embodiment of the present invention;

FIG. 3 is a sectional view of a portion of the flashlamp structure of the present invention;

FIG. 4 is a detailed schematic circuit diagram of the power supplies for activating the flashlamp of the present invention;

FIG. 5 is a sectional mechanical view of the flashlamp and portions of the power supply circuitry for minimizing high frequency effects;

FIGS. 6A-6C are waveform diagrams useful in explaining the sequence of the pulsed discharge of the flashlamp of the present invention; and FIG. 7 is a diagram of a pumped laser using the flashlamp of the present invention in a spherical, reflecting cavity.

DETAILED DESCRIPTION OF THE PREFERRED EMBODIMENT

The present invention contemplates a flashlamp having a stabilized pulsed arc for use as a source of excitation energy in a pulsed laser amplifier or oscillator system. The stability of the high energy pulsed arc is achieved by maintaining a low energy continuous DC arc within the flashlamp which is itself stabilized by a vortex gas flow that confines the discharge plasma for both the continuous and pulsed arcs to the region directly between the flashlamp electrodes.

A flashlamp system in accordance with this principle of the invention is generally illustrated with respect to FIG. 1. A flashlamp 12 has one internal electrode 14 connected to system ground and the opposite electrode 16 connected to a switch 18 which is controlled to apply the potential developed across a capacitor 20 between the electrodes 14 and 16. The capacitor 20 is charged through an impedance 22 from a high voltage charging supply 24. The electrode 16 is also energized from a low voltage DC sustaining supply 26 which is employed to maintain a continuous arc 28 between the electrodes 14 and 16. A pulsed arc is periodically generated by discharging the capacitor 20 through the switch 18 across the electrodes 14 and 16. In order to initiate the arc discharge at the start of operation, a higher voltage starting supply 30 is provided which momentarily applies a high voltage pulse between the electrodes 14 and 16 to achieve the initial breakdown of the gas in the flashlamp 12.

The gas within the flashlamp 12, typically an inert gas such as argon, is circulated between the electrodes 14 and 16 by a gas flow system 32 which applies gas circumferentially around the electrode 16 and extracts it at a lower pressure through the center of electrodes 14 and 16. This generates a radial pressure gradient within the quartz glass tube 34 of the flashlamp 12 due part to the different pressures at the gas inlets and outlets and the vortex pattern of gas flow resulting from the circumferential gas injection. Other inert gases such as xenon or krypton or combinations of these gases with nitrogen, hydrogen or carbon dioxide may be used.

In operation, the vortex flow of gas and pressure gradient will operate to confine the path of the continuous arc discharge 28 to a generally straight line between the electrodes 14 and 16. This effect is augmented during discharge operation by a temperature gradient established between the hot plasma of the discharge 28 and the cooler gas at the periphery of the flashlamp near the walls of the glass tube 34. The continuously maintained path of charged particles in the discharge 28 provides the lower impedance path for the high energy, high voltage discharge from the capacitor 20 periodically connected across the electrodes 14 and 16 through the switch 18 and thereby confines this high energy, pulsed discharge to the path of the continuous discharge 28.

The flashlamp of the present invention is more completely illustrated in a partially sectional and partially pictorial view in FIG. 2. As shown there, the flashlamp 12 includes a cylindrical tube 40, typically quartz, having electrodes 42 and 44 inserted through opposite ends and sealed to the tube 40 through respective O-ring seals 46 and 48. Tube 40 may be double walled to further improve lamp lifetime. The electrodes 42 and 44 may typically be fashioned of copper with tungsten tips and positioned 20 cm apart. The electrode 42, which forms the anode in the present flashlamp structure, has a central hole 50 therethrough from a central tip portion 52 which is typically of tungsten. The hole 50 extends rearward, parallel to the axis of the cylinder 40, into a manifold 54 which joins the channel 50 to an external conduit 56. The manifold 54 is typically of copper and in electrical contact with the anode electrode 42. The general configuration shown permits dissipation of the pulsed discharge shock wave in the region between electrodes 42 and 44 and tube 40.

The manifold 54 is attached to a set of aluminum vanes 58 extending parallel to the cylinder 40 to a support plate 60. Typically, six vanes 58 are provided and are generally of minimal dimension circumferentially so as to intercept or occlude only a small part of the radiation from the flashlamp 12. They, in combination with the manifold 54, provide a support cage for the flashlamp 12 through rigid attachments between the manifold 54, vanes 58 and electrode 42.

The plate 60 has a ceramic collar 62 through which the quartz tube 40 extends a distance to permit a tungsten tip portion 64 of the elongated cathode electrode 44 to extend inside the quartz tube 40 just above the plate 60. The tip portion 64 of the electrode 44 has a hole 66 therethrough which communicates to a pipe 68 which in turn passes through a manifold 70 to a conduit 72 thereby forming a direct passage for gas between the conduit 72 and the region between the electrode tips 52 and 64. Electrode 44 has a widened portion 74 at the point where the conduit 68 communicates with the channel 66. The electrode portion 74 is hollowed to define a chamber which communicates through the manifold 70 to an external conduit 76. The electrode portion 74 has a series of holes 78 from the hollow portion to the sealed region within the quartz tube 40. The holes 78, for example, a dozen in number, are directed partially circumferentially as illustrated in a sectional view in FIG. 3 such that gas supplied in the conduit 76 to the hollowed portion 74 of the electrode 44 is caused to enter the sealed region within the tube 44 at its walls with a radial and circumferential velocity. The widened portion 74 of the electrode 44 locates the exits from the holes 78 near the walls of the quartz tube 40 to assist in establishing a pressure gradient in the gas directed radially outward from the region between the electrodes 42 and 44. The gas is exhausted through the conduits 56 and 72 via the channels 50 and 66 in the respective electrodes. While it is often preferable to exhaust the gas from both electrode tips, only one may be used, and other forms of gas supply and exhaust systems which establish the vorticular flow between the electrodes and pressure gradient may be employed. Coaxial tubes 71 and 73 may be placed around conduit 68 to conduct coolant for electrode 44 from inlet 75 to outlet 77. A similar cooling system may be used in electrode 42.

The manifold 70 is in electrical contact with the electrode 44 and connects to a plate 80 positioned just below the plate 60 and insulated therefrom by insulation layer 82. The plates 60 and 80 form a portion of the electrical circuit for energizing the flash tube as well as the mechanical support for it. The laser system of which it is a part is supported from above. The circuit schematic is illustrated below in FIG. 4, while the structural details of the lamp support is illustrated in FIG. 5.

As illustrated in FIG. 4, the flashlamp 12 has the anode electrode 42 grounded, and the cathode electrode 44 connected through a high impedance resistance 90 to a power supply 92 typically in the range of 7.5 to 12 KV. The resistance 90 is typically 60 K ohms which acts as a dropping resistor to limit the voltage between the electrodes 44 and 42 to approximately 500–3,000 volts for use as a continuous, stabilized DC arc discharge. Initiation of this discharge is provided by the start source 30 which comprises a high voltage AC coupling capacitor 94 in series with a secondary winding 96 of a high voltage step-up transformer 98. A voltage of approximately 60 KV is established in a pulse across the secondary winding 96 by connecting the primary winding 100 of the transformer 98 to a low value DC start voltage acting as a turn-on signal for the flashlamp to establish the continuous, stabilized low energy DC discharge.

The cathode electrode 44 of the flashlamp 12 is periodically pulsed by a higher voltage to establish a high energy discharge for use in energizing a laser medium. This high voltage pulse is applied from the plate of an electronic switch 102, typically a thyratron, which is connected to the electrode 44. The cathode of the thyratron 102 is connected to the high voltage, in this case high negative voltage, terminal of a high voltage capacitor 104, typically a significant fraction of a microfarad. A diode, capacitor and resistor network 106 is connected across the capacitor 104 to leak to ground positive voltages appearing across the capacitor after discharge through the thyratron 102 as will be more fully explained below.

The capacitor 104 is charged through a high value inductor 106, typically a fraction of a henry, which has a high frequency damping shunt circuit consisting of a series capacitor 108 and resistor 110 across it. Current is applied through the inductor 106 from a further electronic switch 112, typically also a thyratron, and through a low value inductor 114 acting as a high frequency impedance. The switch 112 and inductor 114 are damped at high frequencies by a series combination of a resistor 116 and capacitor 118. The electronic switch 112 acts to transfer charge from a high voltage capacitor 120, typically several microfarads, to the discharge capacitor 104 through the inductor 106. Capacitor 120 is connected across power supply 92.

By charging the capacitor 104 through the inductor 106, it is possible to achieve a voltage augmenting effect, employing the inductor 106 as a current pump which will continue to supply current to the capacitor 104 beyond the point where the voltage across it exceeds the voltage from the capacitor 120. In this manner, it is possible to double the voltage across the capacitor 104 to approximately 15 to 24 KV with respect to the voltage of the supply 92 which is used to charge the capacitor 120 to a voltage in the 7.5 to 12 KV range.

The thyratrons 102 and 112 are triggered by pulses applied through respective transformers 122 and 124 across the grid-cathode electrodes. The trigger signal for the thyratron 112 may be applied directly from a pulse trigger on a line 126 while a delay circuit 128 of variable delay is interposed between the line 126 and the trigger transformer 122 for the thyratron 102. This causes the capacitor 104 to be charged for a predetermined interval specified by the delay circuit 128 after activating the thyratron 112 before that charge is transferred across the electrodes of the flashlamp by activation of the thyratron 102.

The diagrams of FIGS. 6A–6C are useful in explaining this sequence. FIG. 6A describes the voltage across the capacitor 104 which can be seen to increase from a zero level to a fully charged, high negative voltage level 130 during an interval "delta t" after a pulse 132 illustrated in FIG. 6B is applied to the thyratron 112. After the interval "delta t" prescribed by the delay circuit 128, a further trigger pulse 134 shown in FIG. 6C and provided from the delay circuit 128 activates the thyratron 102 through the pulse transformer 122 causing the voltage built up to the level 130 across the capacitor 104 to be applied across the electrodes 42 and 44 of the flashlamp. The transient discharge of the capacitor 104 will excite the resonant circuit formed with the flashlamp inductance and capacitor 104 causing an overshoot 136 which the network 106 rapidly decays as an overdamped resonance shown in FIG. 6A.

With reference now to FIG. 5, there is shown structure for holding the flashlamp, discharge capacitor 104 and trigger thyratron 102 in a support and circuit configuration which permits fast rise time pulsing. As shown there, the plate 60 through which the flashlamp protrudes, extends to a region which houses the capacitor 104 within a conductive enclosure 140. Enclosure 140 electrically connects the plate 60 to the ground terminal of the capacitor 104. The plate 60 is apertured within the enclosure 140 to permit the other terminal of the capacitor 104 to extend through a ceramic collar 143 to a connection plate 142 that is set over the aperture of a further plate 144. Plate 144 is applied against but spaced from the conductive plate 60 by insulating layers 82. The plates 142 and 144 are electrically conductive and connected to the high voltage resonant charging current from the inductor 106. The plate 80, as mentioned above, is positioned below the plate 60 and insulatingly separated therefrom by the layers 82, and has a portion 147 extending orthogonally down and away from the plate 60. The plate 144 has a similar portion 150 extending orthogonally downward. Portions 148 and 150 are separated by insulating layers 148 and 152. The thyratron 102 is electrically connected between the conductive portions 148 and 150 and using leads 154 which electrically contacts the plate of the thyratron to the plate portion 150. A cover 155 and plate 158 connect the cathode to plate portion 147. A ceramic insulating sleeving 156 surrounds the thyratron 102. The trigger input to the grid of the thyratron 102 is applied on a lead 160 through cover 155.

Slotting of the conductive plates may be desired to reduce the magnetic fields at the thyratron.

The use of the configuration illustrated in FIG. 5 permits rapid rise times in the voltage across the electrodes of the flashlamp 12 and thereby rapid initiation of a high energy discharge pulse at repeated intervals in the radiation from the flashlamp 12.

For energization of a laser medium with radiation from the flashlamp 12, it is typically installed within a reflective sphercial cavity 162 illustrated diagrammatically in FIG. 6 and shown more clearly in a right angular sectional view in FIG. 7. As shown there, the flashlamp 12 protrudes inward into the spherical cavity 162 towards the center in the bottom half thereof. A dye channel 164 having a thin rectangular cross-section extends across the top half of the spherical cavity 162 and is narrowed in the center to an active lasing region 166 which is on an axial extension of the axis of the flashlamp 12. Optically transparent windows 168 and 170 border the active region 166 to admit excitation radiation which is reflected by the polished interior surface of the spherical cavity 162 from the flashlamp 12 to the active lasing region. For using the laser as an oscillator, a reflective mirror 172, typically 100% reflective, is located below the active region 166 and forms one end of the resonant cavity for the active lasing medium 166. Alternatively, where the laser is to act as an amplifier instead of an oscillator, the mirror 172 may be angled to reflect light pumped into the sphercial cavity 162 from a horizontal aperture into the active lasing region 166 for amplification and emission as an amplified output beam 174.

Typically, a dye solution is applied through the channel 164 at a high flow rate to permit high pulse rate lasing of the dye within the active region 166 by repeated activation of the high energy discharge in the flashlamp 12. The continuous DC arc has insufficient energy to induce lasing in the medium until the high energy pulse discharge occurs periodically thereby producing pulsed lasing of the medium in channel 164.

The laser system of FIG. 7 is particularly useful for applications of laser enrichment by isotope separation and in this case the radiation in the output beam 174 will typically be tuned for selective excitation or ionization of one isotope in a mixture of isotopes. A technique employing laser radiation for laser enrichment is illustrated in U.S. Pat. No. 3,772,519, specifically incorporated herein by reference and assigned to the same assignee as the present application. Accordingly, when the laser system illustrated above is to operate as an oscillator, the mirror 172 will form one end of a tuned laser cavity, the frequency of oscillation of which is selected and limited for isotopically selective photoexcitation of a uranium isotope.

It is to be understood that the above-described preferred embodiment for the present invention is exemplary only and that alternative dimensions and configurations may be employed within the spirit of the invention. Accordingly, it is intended to limit the scope of the invention only as defined in the following claims.

What is claimed is:

1. A stabilized pulse operated flashlamp laser comprising:
   first and second electrodes;
   an enclosure for said first and second electrodes and containing an atmosphere of a predetermined gas;
   means for flowing said gas through said enclosure;
   means for imparting a motion to said gas in flowing through said enclosure which comprises a circulation around an axis between said first and second electrodes;
   means for initiating breakdown of the gas between said electrodes;
   means for maintaining breakdown of the gas between said first and second electrodes as a stabilized continuous discharge;
   means for repetitively augmenting the current of said discharge to provide an augmented output of radiant energy from said discharge;
   a conduit containing a flowing laser medium and having a window for the application of excitation radiation to said flowing laser medium;
   means for directing radiation pulses from said flashlamp to the flowing laser medium in said conduit; and
   means for defining a laser beam from said laser medium as a result of lasing action of said medium in response to each pulse of excitation radiation from the discharge between said first and second electrodes;
   the continuous discharge between said first and second electrodes producing insufficient energy to generate lasing of said laser medium whereas the level of radiant energy from said flashlamp during each pulse of discharge is sufficient to provide substantial lasing of said medium.

2. The flashlamp of claim 1 wherein said means for imparting motion includes means for establishing a pressure gradient in the gas within said enclosure with the higher pressure being away from the region of discharge.

3. The flashlamp of claim 2 wherein a temperature gradient exists between said discharge at the hotter temperature and the enclosure for said electrodes.

4. A flashlamp of claim 1 wherein said electrodes include a central passage exhausting said gas to said flowing means.

5. The flashlamp of claim 4 further including:
   a plurality of ports through at least one of said electrodes and inclined with respect to said axis; and
   means for directing the input flow of said gas through said ports to provide said circulation.

6. The flashlamp of claim 1 wherein said gas includes a gas selected from and including one or more of the group consisting of xenon, argon, krypton.

7. The flashlamp of claim 6 further including a gas selected from the group consisting of hydrogen, nitrogen and carbon dioxide in combination with the gas specified in claim 6.

8. The flashlamp of claim 1 wherein the instantaneous voltage level across said continuous discharge is at least approximately an order of magnitude less than the voltage level across said pulse discharge.

9. The flashlamp of claim 1 wherein said means for providing augmented output from said discharge includes:
   a capacitor;
   means for charging said capacitor to at least approximately 7.5 KV;
   means for switching the charge on said capacitor across said first and second electrodes.

10. The flashlamp of claim 9 wherein said switch means includes a thyratron.

11. The flashlamp of claim 10 further including a support structure for said first and second electrodes, said capacitor and said thyratron including:

a top conductive plate having on one portion a conductive cage connected with said plate and containing therein said enclosure for said first and second electrodes with one of said first and second electrodes electrically connected to said cage and having at another portion thereof an electrically conductive shield in electrical contact with said plate and containing said capacitor therein with one terminal of said capacitor connected to said shield;

a first bottom plate with a portion below the portion of said top plate having said capacitor and insulated therefrom with the other terminal of said capacitor connected thereto;

a second bottom plate extending below the portion of said top plate having said first and second electrodes and insulated therefrom with the other of said first and second electrodes connected thereto;

said first and second bottom plates having facing portions and containing in apertures thereof said thyratron with the cathode thereof connected to said first bottom plate and the plate thereof connected to said second bottom plate;

said means for charging said capacitor being connected to said first bottom plate and said means for maintaining said discharge being connected to said second bottom plate; and said means for augmenting the discharge current including means for activating the control grid of said thyratron for each pulse of radiation to be generated in the augmented discharge between said first and second electrodes.

12. A stabilized pulsed flashlamp for energizing a laser medium comprising:

a base plate of a conductive material and having a hole therethrough;

a support cage extending above said hole;

a transmissive tube extending through said hole into said cage and through said hole below said base plate;

a first electrode sealed in one end of said tube and projecting downward toward said hole;

a second electrode sealed in the opposite end of said tube and extending into said tube through the hole of said plate;

said first and second electrodes having apertures therethrough to permit the circulation of a gas through said tube between said first and second electrodes;

means for circulating an inert gas between said first and second electrodes through said tube;

at least some of the apertures of said first and second electrodes being oriented to provide a generally circumferential flow to the gas circulated through said tube between said first and second electrodes;

means for maintaining a discharge continuously between said first and second electrodes with said discharge stabilized by the generally circumferential circulation and resulting radial pressure distribution of said gas between said first and second electrodes; and means for repeatedly augmenting said discharge to provide excitation for said laser medium.

13. The flashlamp of claim 12 further including:

means for flowing said laser medium;

means for admitting laser excitation to a region of the flowing laser medium; and means for focusing each pulse of radiation from said discharge between the first and second electrodes through the means for admitting radiation into said flowing laser medium.

* * * * *

UNITED STATES PATENT AND TRADEMARK OFFICE
CERTIFICATE OF CORRECTION

PATENT NO. : 4,074,208
DATED : February 14, 1978
INVENTOR(S) : Michael E. Mack, Donna B. C. Northam It is certified that error appears in the above-identified patent and that said Letters Patent are hereby corrected as shown below:

Column 1, line 22, "pulses a" should read —pulses of—.

Column 7, line 8, "sphercial" should read —spherical—.

Signed and Sealed this

Fifteenth Day of May 1979

[SEAL]

Attest:

RUTH C. MASON
Attesting Officer

DONALD W. BANNER
Commissioner of Patents and Trademarks